United States Patent [19]  
DeAngelis

[11] Patent Number: 4,746,363  
[45] Date of Patent: * May 24, 1988

[54] REACTION SINTERED CERMET

[75] Inventor: Thomas P. DeAngelis, Big Flats, N.Y.

[73] Assignee: Corning Glass Works, Corning, N.Y.

[*] Notice: The portion of the term of this patent subsequent to Apr. 30, 2002 has been disclaimed.

[21] Appl. No.: 64,837

[22] Filed: Jun. 19, 1987

Related U.S. Application Data

[63] Continuation of Ser. No. 454,669, Dec. 30, 1982, abandoned.

[51] Int. Cl.$^4$ .............................................. C22C 29/14
[52] U.S. Cl. ........................................ 75/244; 75/230; 419/10; 419/12; 419/13; 419/23; 419/45; 419/48
[58] Field of Search ................... 419/10, 12, 13, 23, 419/45, 48; 75/230, 244

[56] References Cited

U.S. PATENT DOCUMENTS

| | | | |
|---|---|---|---|
| 3,353,954 | 11/1967 | Williams | 419/45 |
| 3,690,875 | 9/1972 | Bredz et al. | 419/45 |
| 4,155,755 | 5/1979 | Sara | 419/13 |
| 4,235,630 | 11/1980 | Babu | 75/244 |
| 4,251,272 | 2/1981 | Sara | 419/13 |
| 4,324,356 | 4/1982 | Blair et al. | 419/13 |
| 4,431,448 | 2/1984 | Merzhanov et al. | 419/45 |
| 4,432,794 | 2/1984 | Holleck | 419/45 |
| 4,454,015 | 6/1984 | Ray et al. | 204/293 |
| 4,511,402 | 4/1985 | Miura et al. | 419/13 |
| 4,514,268 | 4/1985 | DeAngelis | 75/244 |
| 4,584,172 | 4/1986 | Ray et al. | 419/45 X |
| 4,585,618 | 4/1986 | Fresnel et al. | 419/12 |
| 4,610,726 | 9/1986 | King | 419/12 |
| 4,689,077 | 8/1987 | Chevigne et al. | 419/13 |

*Primary Examiner*—Stephen J. Lechert, Jr.  
*Attorney, Agent, or Firm*—Richard N. Wardell

[57] ABSTRACT

Cermet body formed by reaction sintering at pressures ranging from subatmospheric to superatmospheric of admixed and shaped particulate exothermic reactants, which have maximum particle size substantially not greater than 150 μm and can be elements, compounds, intermetallic compounds and/or alloys, in stoichiometric proportions to substantially form 40–95 mole percent of first phase or phases being boride, nitride, silicide, sulfide or combination thereof of one or more of the elements of Groups 2a, 3a exclusive of B, 4a, 2b, 3b including lanthanide and actinide series elements, 4b, 5b, 6b, 7b and 8, and 5–60 mole percent of second phase or phases being metal, alloy, intermetallic compound or combination thereof of one or more of the elements of Groups 3a exclusive of B, 4a, 2b, 4b, 5b, 6b, 7b, iron, cobalt and nickel, wherein the maximum grain size of the first phase or phases is substantially not greater than 10 μm and which body contains 0 to 4 weight percent oxygen.

19 Claims, No Drawings

REACTION SINTERED CERMET

RELATED APPLICATION

This is a continuation of application Ser. No. 454,669 filed Dec. 30, 1982 abandoned.

BACKGROUND OF THE INVENTION

The field of the invention is cermet bodies which have first phase or phases of nonoxide ceramic compound and second phase or phases of metal, alloy and/or intermetallic compound. The nonoxide ceramic compounds are boride, nitride, silicide, sulfide and combination thereof. A combination of these compounds can be either two discrete phases or a single complex phase.

Most commonly heretofore, these cermet bodies have been of the type physically formed of ingredients corresponding to the crystalline phases in the bodies. By way of exemplary illustration, reference is made to the following prior art documents. U.S. Pat. No. 3,037,857 discloses mixing, shaping and heating particulate refractory metal boride with either powdered or molten aluminum metal or alloy to yield solid cermet bodies of the same boride and metal or alloy phases. U.S. Pat. No. 3,274,093 discloses cold-pressing titanium diboride powder to form a porous body that is impregnated with molten aluminum. Belgian Pat. No. 644066, U.S. Pat. No. 3,178,807 and U.S. Pat. No. 3,459,515 disclose mixing, explosively compacting and heating particulate mixtures of aluminum and certain carbide and/or boride to yield bodies of essentially the same aluminum and carbide and/or boride phases. U.S. Pat. No. 3,328,280 discloses mixing and, either simultaneously or sequentially, pressing and heating particulate mixtures of aluminum nitride and titanium diboride and/or aluminum.

Cermet bodies of the type described in the preceding paragraph have properties which are dependent upon and limited by the inherent effects of the physical nature of their ingredients which are physically combined. The distribution and sizing of the phases are generally directly related to the particle sizing and mixing of ingredient powders and to sizing and distribution of pores in a porous body that is impregnated. The powders are not always easily available in uniformly fine sizes for obtaining superior properties. Milling of powders to improve their sizing can lead to oxidation contamination of the metal and nonoxide powders in the absence of controlled atmosphere milling requiring extra cost. In fact, some powders such as $TiB_2$ in sizes of 5 μm or finer present fire and explosion hazard during milling due to their rapid reaction with oxygen in air under conditions of frictional heating. Oxidation contamination often interferes with proper sintering of the powder mixtures, with or without simultaneous pressing, so that the resultant body is weak and has relatively poor properties. Although explosive compaction was proposed to overcome the latter difficulty, it has serious drawbacks that limit its usefulness, as is explained in the article by C. Hoening and C. Yust entitled "Explosive Compaction of AlN Amorphous $Si_3N_4$, Boron, and $Al_2O_3$ Ceramics" in the American Ceramic Society Bulletin, Vol. 60 (1981) beginning at p. 1175.

Amongst numerous reactions for forming other types of multiphase bodies by an unusual reaction hot pressing process involving passage of electric current through the reaction mixture during the process, U.S. Pat. No. 3,143,413 discloses only one reaction hot pressed cermet of metal and nonoxide ceramic phases, viz. the molar combination of $Ni + 2BN + TiN + 2 ZrC$, but no details are given about the properties of such body made from −60 mesh starting powders hot pressed at temperature between 1800°–2300° C.

There has been a continuing need for cermets of metal and nonoxide phases with easily controlled and predictable composition, crystal structure (including uniform phase distribution and fine grain size) and related physical properties, and which can be easily and economically fabricated in a variety of shapes.

SUMMARY OF THE INVENTION

It is an object of this invention to provide a product or body which substantially overcomes the aforesaid limitations of the prior art and enables the practical attainment of greater technical and economic case and flexibility in providing cermet bodies of metal and nonoxide phases with specially tailored and improved properties as noted herein.

It is also an object of this invention to provide certain advantageous product features as detailed hereinafter.

The invention is characterized by the discovery of a novel, very tough and hard, reaction sintered cermet body and the method of forming it, which body is characterized by uniformly fine-grained and intimately interdispersed phases of metal, alloy and/or intermetallic compound and of nonoxide ceramic compound or compounds easily obtained from reactants generally having substantially larger particle sizing than the grain size of the phases in the cermet body, viz. usually one order of magnitude larger. In comparison with a body of corresponding chemical composition made as a hot pressed physical mixture of commercially available particulate materials, the reaction hot pressed body of this invention is noted for superior properties, such as virtual absence of open porosity, great toughness and hardness, very notable elev: :d temperature deformation resistance, enhanced flexure strength, improved corrosion-/erosion resistance to molten aluminum and cryolite (with Al metal phase) and lower electrical resistivity (notably with refractory metal boride phase). The body of the invention is also characterized by good thermal shock and oxidation resistance, and by some degree of ductility on impact. It is also notable that these valuable properties are attainable in the body of the invention despite some oxygen contamination therein.

The invention is a reaction sintered cermet body consisting of a fine-grained, homogenous, intimate interdispersion of:

(a) 40–95 (preferably 45–95) mole percent of first phase or phases having a maximum grain size substantially (e.g. at least 95 volume percent) not greater than 10 μm and being boride, nitride, silicide, sulfide or combination thereof one or more of the elements of Groups 2a, 3a exclusive of B, 4a, 2b, 3b including lanthanide and actinide series elements, 4b, 5b, 6b, 7b and 8;

(b) 5–60 (preferably 5–55) mole percent of second phase or phases being metal, alloy, intermetallic compound or combination thereof of one or more of the elements of Groups 3a exclusive of B, 4a, 2b, 4b, 5b, 6b, 7b, iron, cobalt and nickel; and (c) optionally diluent selected from nonreacted portion of reactants forming the first and second phases and preformed material that is the same as the first and/or second phases;

which body contains 0 to 4 (preferably<1) weight percent oxygen and is prepared by the process comprising:

(d) admixing particulate exothermic reactants of maximum particle size substantially (e.g. at least 95 volume percent) not greater than 150 μm and being elements, compounds, intermetallic compounds, alloys or combination thereof in stoichiometric proportions to substantially form the first and second phases, and (e) shaping and heating the admixture to form the reaction sintered body, and heating being done in nonreactive atmosphere and at temperature at which the reaction and sintering occurs between the reactants to substantially form the first and second phases.

Reaction sintering involves the dual effect of reaction between and sintering together of the admixed particulate reactants at temperature causing the reaction to occur and be substantially completed. It may be effected at atmospheric, subatmospheric or superatmospheric pressure. The latter condition involves the substantially simultaneous shaping and heating steps of hot pressing to produce a body of the invention with very little or no open porosity and highest strength properties, although some preliminary separate pressing or heating of the reactant admixture may be advantageously done. Where open porosity is desired in an otherwise tough and hard body of the invention, the separate heating step at atmospheric or subatmospheric pressure may be employed sequentially following the shaping step.

Of course, reaction temperature is governed by the particular reactants and their identified reaction temperature at whatever pressure is selected for preforming the heating step.

An especially unique body of the invention has very fine grain sizing and thickness of the layer of metal, alloy and/or intermetallic compound at least partially separating the grains of nonoxide ceramic phase. The latter layer thickness is generally not greater than 1 μm and, for best strength and deformation resistance, it is less than about 1000Å. Desirably the mean grain size of the first or nonoxide ceramic phase or phases is not greater than 6 μm and the mean particle size of the reactants is less than 100 μm.

The body of the invention may contain, as part of the first and/or second phases, diluent which is a nonreacted portion of the reactant admixture as a stoichiometric excess amount of a reactant and/or as a metal, alloy, intermetallic compound or nonoxide ceramic compound according to the aforesaid invention definition but different than the reactants.

DETAILED DESCRIPTION

It is believed that reaction sintering relies on the reaction having a substantial negative heat of formation as the driving force for the reaction. The products or bodies formed must have lower free energy of formation than the reactants from which they were prepared. The elements of the groups of the Periodic Table as recited in the description of the invention are selected for the invention body so as to conform to these principles.

Reaction sintering is initiated by heating the shaped mixture. At the reaction initiation temperature, the reactants begin to react and liberate a substantial amount of heat. This exotherm causes a sharp temperature rise in the reactant powder mixture. It is believed that this rapid temperature rise permits rapid diffusion of the reactants within the mixture, which causes either hot pressing compaction or sintering shrinkage under atmospheric or subatmospheric pressure as well as further chemical reaction to occur quickly. The reaction initiating temperature is generally much lower than the temperature necessary to attain a dense body by conventional hot pressing or separate pressing and sintering of preformed phase ingredients where no reaction occurs. This is particularly beneficial in this invention where higher temperatures may be deleterious to the metal phase.

Several processing parameters may be adjusted to optimize the conduction of the reaction sintering and the properties of the resultant cermet body. Some of these parameters are: type, purity and surface area of the particulate reactants; stoichiometry of the reactant mixture; pretreatment of the reactants, rate of heating; magnitude of applied pressure before and/or during heating; post heating treatments; and geometry of the body or product.

Reaction sintering of admixtures according to this invention produces articles or bodies with the nonoxide ceramic compound phase or phases having very small grain size, generally about one order of magnitude smaller than the particle size of the starting reactant powders. The reaction sintered cermet bodies can be easily prepared with maximum grain sizes of the nonoxide ceramic compound phase or phases being substantially (e.g. at least 95 volume percent) not greater than 5 μm (preferably 2 μm) or even less with mean grain sizes of such phase or phases being less than 1 μm. These very fine grain sizes can be attained by using reactants with maximum particle sizes substantially (e.g. at least 95 volume percent) not greater than 44 μm or with mean particle sizes less than about 20 μm. Grain growth is usually not experienced because the products or bodies can be made at significantly lower temperatures with shorter hold times at heating temperature than by conventional nonreactive manufacturing techniques. Achieving such small grain sizes is often difficult if not impractical to accomplish using conventional nonreactive techniques because many preformed phase powders are not readily available in such small particle size of less than 5 μm for the reasons noted above.

Generally the particulate reactants are mixed in the stoichiometric proportions to form the desired product phases. For example, the following molar proportion formula describes exemplary reaction mixture and product phases:

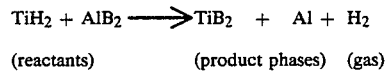

$$TiH_2 + AlB_2 \longrightarrow TiB_2 + Al + H_2$$

(reactants)          (product phases)     (gas)

However, nonstoichiometric proportions may be used in order to vary the properties of the product or to control the reaction process. Powdered diluent material may also be added to the reactant mixture. The diluent may be or contain one of the elements of the reactants or may be the same as one of the reaction-produced phases in the products or may be other suitable material, any of which may be used to control the reaction sintering or properties of the resultant product. The amount of diluent or diluents must be less than that amount which would prevent the reaction sintering from taking place.

The reactants can be mixed or blended in any suitable manner known to those skilled in ceramic technology for yielding an intimate, homogenous mixture of reactant particles, e.g. by ball milling in dry or wet condition.

For very dense products, the hot pressing procedure, including hot isostatic pressing, is employed. The mixed reactants are charged into a mold. If desired, those reactants may be given pretreatments such as dehydration, degassing or burn-out of binder, provided the pretreatment temperature is kept below the reaction initiation temperature. It is advantageous to precompact the reactant mixture at room temperature and at 50-100% of hot pressing pressure to ensure a uniformly compacted product after hot pressing. This was routinely done in making samples of the invention. For common hot pressing with a mold comprising an annular die with upper and lower plungers, the mold for precompaction (and even pretreatment) is preferably the same on used in subsequent hot pressing. The mold can be of any material not adversely reactive with the reaction mixture and that can withstand desired pressures up to 15,000 psi (about 1055 kg/cm$^2$) or more. Graphite molds have been found very suitable for pressures up to 10,000 psi (about 700 kg/cm$^2$) and were exclusively used in making the samples of the invention. At least the precompaction pressure is usually applied to the charged mold and a suitable atmosphere is provided to completely contact the charged mold before heating is begun to effect reaction hot pressing. A moderate vacuum (e.g. about $1 \times 10^{-4}$ Torr) was satisfactorily employed in making the samples of the invention; however, inert gas atmosphere may also be employed for the same purpose of protecting the reactants and the mold from adverse air oxidation. As necessary, the pressure is increased to the full load during heating to or at the maximum hot pressing temperature. To assure good body density, full pressure should be at least 2000 psi (about 140 kg/cm$^2$). Heating can be done in any suitable hot pressing furnace, such as an induction heating furnace or electric resistance heating furnace use to make samples of the invention, which provides very rapid heat-up. Heating rates satisfactorily employed ranged between 9 and 25° C./minute, the slower rates being used with reactant mixtures evolving hydrogen that is drawn off by the vacuum system. Heating progresses to a temperature at which the reaction sintering is initiated. That event is marked by a rapid temperature rise in the mold due to exothermic heat evolution from the reaction. When the maximum temperature and pressure for the reaction hot pressing are attained, they are usually held for at least some short period to assure complete reaction sintering, e.g. about 1-2 hours for products ranging between 1.5-3 inches (about 3.8-7.6 cm) in diameter and about 0.2-0.5 inch (about 0.5-1.3 cm) thick as in the cases of the samples made of the invention. Thereafter, the molds containing the samples are cooled in the furnace under protective atmosphere at furnace cooling rate and the pressure is held on the samples until they were cooled to about room temperature. Then the molds are removed from the furnace and the samples are pressed out of the annular mold body.

In making larger size bodies (e.g. 4 inches or about 10 cm diameter $\times$ 1 inch or 2.5 cm thick) containing hydride reactant, it is desirable to precompact the reactant mixture and heat that compact in a vacuum furnace where the compact is merely supported by a setter in order to safely remove the larger volume of hydrogen. This heating is done at about 650° C. for TiH$_2$ and the heating period is sufficient to remove the hydrogen, e.g. 5-6 hours for one or two compacts and as long as 2 days for about 28 compacts heated at one time. Thereafter, these pretreated compacts are cooled to room temperature, removed from the vacuum furnace and then reaction sintered as previously described.

For bodies of lesser density, the reactant mixture can be fully compacted or shaped at room temperature generally at pressures up to 60,000 psi (about 4.2 tons/cm$^2$) or more, but preferably between $10-50 \times 10^3$ psi (about 0.7-3.5 tons/cm$^2$), to yield a green (i.e. unfired) body. Preforming of the green body can be done by any suitable ceramic fabrication process, e.g. dry or wet pressing, isostatic pressing, slip casing, extrusion, injection molding, doctor blading, etc.

The cermet bodies of this invention can be specially designed to have selected useful properties from a variety of choices depending upon their composition and processing. Generally they are very refractory and thermal shock resistant. They are also generally electroconductive. Many have low electrical resistivity and can function as electrodes or electrical conductors in a variety of applications. With resistance to chemical attack, such electrode and conductor applications can be in industrial electrochemical processes including electrolytic metal production (electrowinning and electrorefining) cells, batteries and fuel cells. Some bodies can have adequate electrical resistance to function as electrical resistance elements such as heating elements. Most of them are relatively wear-resistant and hard. They can also exhibit good strength and excellent toughness. Consequently, those bodies can also serve as cutting tool tips, grinding media, high temperature bearings, engine components and other structural parts. In their more porous form, they may serve, for example, as filters for molten metal, as diaphragms or other components of electrolytic metal production cells, or as high surface area or catalytic devices.

The above-described reaction sintered cermet body, preferably in hot pressed form, is especially suited for components of an electrolytic aluminum production (electrowinning and electrorefining) cell in contact with the liquid contents thereof when the second phase is aluminum metal and the first phase is or phases are boride, nitride, silicide and/or sulfide of metal selected from Groups 4b, 5b and 6b. Especially desirable is the body of diboride of metal selected from Group 4b (particularly titanium) and aluminum metal.

Bodies A and B

The following two bodies are an exemplary comparison of a reaction hot pressed cermet body and a conventionally nonreaction hot pressed cermet body. Both had batch mixtures formulated to give 1:1 molar ratio of TiB$_2$ and aluminum metal phases in those bodies.

Body A of the invention was formed in accordance with the previous molar formula as follows: The batch components consisted of 50.7 wt. % TiH$_2$ powder of 2.4 $\mu$m mean particle size (mps) and 49.3 wt. % AlB$_2$ powder of 18.5 $\mu$m mps and containing a small amount of free aluminum. The TiH$_2$ powder contained 3.23 wt. % oxygen and 0.02 wt. % carbon as impurities. The AlB$_2$ powder contained 1.37 wt. % oxygen and 0.2 wt. % carbon as impurities. These reactants were dry mixed without binder in a revolving plastic jar with alumina balls. The reactant mixture was hot pressed in a graphite mold and in vacuum at a maximum reaction sintering temperature of 1100° C. at 6000 psi (421.8 kg/cm$^2$) for 2 hours. During heating, $TiH_2$ substantially decomposed at temperatures in the range of about 400°–500° C. The $AlB_2$ substantially decomposed as the temperature advanced from about 650° C. to about 900° C. and beyond. An intermediate or transitory phase formation of aluminum-titanium alloy apparently formed and was then consumed in further reaction as the temperature progressed through the range of about 700°–1100° C. The reaction was completed at 1100° C.

Body B not of the invention was formed as follows: The batch components consisted of 72 wt. % $TiB_2$ powder of 3.2 μm mps and 28 wt. % aluminum powder of 43 μm mps. The $TiB_2$ powder contained 0.36 wt. % oxygen, 0.26 wt. carbon and 0.02 wt. % nitrogen. The aluminum powder contained 0.096 wt. % oxygen, 0.005 wt. % carbon and 0.01 wt. % nitrogen. These nonreactive components were wet mixed with trichlorethane in a revolving plastic jar with alumina balls. The nonreactive mixture was hot pressed in the same manner as for Body A except the time period was only 1 hour.

The comparative properties of Bodies A and B are set forth in Table 1. Note 1: (M) indicates major phase peaks, (m) indicates minor phase peaks and (T) indicates trace phase peaks. Note 2: N.D. indicates that property was not determined. Note 3: A nonreaction hot pressed body of 75 wt. % $TiB_2$ and 25 wt. % Al exhibited deformation starting at about 700° C. under 50 psi (3.5 kg/cm²) load in air. Note 4: Lack of deformation @1100° C. was observed on a ⅛×⅛×2 inch (3.2×3.2×50.8 mm) test bar; however, deformation was observed between about 670°–700° C. on other ⅛×⅛×3 inch (3.2×3.2×76.2 mm) test bars of similar composition, but having $TiB_2$ phase grain size of mostly 1–2 μm, under load of 250 psi (17.6 kg/cm²). Note 5: No further oxidation at 1050° C. occurred up to 180 hours; whereas a hot pressed sample of only $TiB_2$ exhibited oxidation of about 20 mg/cm² about 180 hours at 1050° C. in air with continuing oxidation expected.

In Body A, the very small (mostly on the order of 0.1–0.5 μm) $TiB_2$ grains are intimately interdispersed with and separated by thin layers of aluminum metal, which are estimated to be less than about 1000Å thick in this dense body. $TiB_2$ grains frequently appear as plate-like particles under scanning transmission electron microscopy, the smallest of which is about 0.05 μm wide.

TABLE 1

|  | Body A | Body B |
| --- | --- | --- |
| x-ray phases (see Note 1) | $TiB_2$ (M) | $TiB_2$ (M) |
|  | Al (m) | Al (m) |
|  | $Al_2O_3$ (T) | Unknown (T) |
| Al, wt. % | 23.7 | 21.6 |
| Ti, wt. % | 46.3 | 52.1 |
| $O_2$, wt. % | 1.7 | 1.05 |
| C, wt. % | 0.2 | 0.21 |
| $N_2$, wt. % | 0.1 | <0.006 |
| $TiB_2$ phase grain size, μm mostly | ≦2 <1 | ≧3.2 |
| Density, g/cc | 3.6 | 3.4 |
| Open porosity, % | 0 | 10.5 |
| Modulus of rupture @ 20° C., psi × 10³ | 55.1 | 43.9/48.8 |
| (tons/cm²) | 3.87 | 3.09 |
| Young's Modulus @ 20° C., psi × 10⁶ | 35.6 | 23.9 |
| (tons/cm² × 10³) | 2.50 | 1.66 |
| Shear Modulus @ 20° C., psi × 10⁶ | 14.8 | 9.9 |
| (tons/cm² × 10³) | 1.04 | 0.70 |
| Poisson's ratio @ 20° C. | 0.200 | 0.198 |
| Beam bend deformation: |  |  |
| 50 psi (3.5 kg/cm²) load @ 1200° C. in air | None | See note 3 |
| approx. 440 psi (30.9 kg/cm²) load in argon @ 1100° C. | None | N.D. |
|  | (see Note 4) | See note 2 |
| Rockwell C hardness | 42 | <10 |
| Knoop hardness | 400 | N.D. |
| Electrical resistivity, μΩ-cm in argon: |  |  |
| 25° C. | 10.2 | 14.8 |
| 250° C. | 14.5 | N.D. |
| 500° C. | 28.2 | N.D. |
| 750° C. | 50.1 | N.D. |
| 1000° C. | 63.1 | N.D. |
| Oxidation, mg/cm²: |  |  |
| 1000° C. for 48 hours in air | <2.5 | N.D. |
| 1050° C. for 30 hours in air | approx. 4 (see Note 5) | N.D. |
| Thermal shock |  |  |
| 1050° C. → 20° C. in air | No crack | N.D. |
| 20° C. air → 1000° C. molten Al → 20° C. air | No crack | N.D. |

Body A and other reaction sintered, cermet bodies of this invention were found to be extremely tough. They were cut with a diamond saw only with extreme difficulty and were not polished easily with either diamond or SiC. Electric discharge machining (EDM), e.g. with a wire electrode, or electrochemical machining were found useful for cutting these new materials.

In relation to most glasses and ceramics, these new reaction sintered cermet bodies exhibit some ductility under mechanical loading. Such bodies have been dented by impact loads insufficient to cause fracturing thereof. Also gradually applied loads short of causing fracture failure have resulted in indications of some permanent inelastic or plastic deformation in a test piece of Body A. Presumably the presence of the metal phase provides such limited but notable ductile character to such bodies.

Body A was also tested for suitability for use as a component, e.g. cathode or cathode current collector, in an electrolytic aluminum production cell. In a cathode pool test, a sample of Body A was merely placed submerged (but not connected at the cathode) in the molten aluminum cathode pool of a laboratory test cell operated at about 1000° C. for 10 hours with anode and cathode current density of about 0.5 A/cm². In a hanging cathode test, a sample of Body A was suspended and connected as the cathode extending into the representative molten cryolite-aluminum bath of the laboratory test cell operated as noted above. In a commercial cell test, a sample of Body A was merely placed submerged (but not connected as the cathode) in the molten aluminum cathode pool of 60,000 ampere Hall Heroult cell for 2 weeks and also for 4 weeks. In all these tests, the molten aluminum wetted the sample, and the sample exhibited no significant corrosion, erosion or dimensional change except for some slight surface layer exfoliation (only about 50 μm thick) in a few areas. In contrast, bodies somewhat similar in composition ($TiB_2$:Al molar ratio of 75:25) and generally similar in method of formation to that of Body B exhibited substantial corrosion/erosion in cathode pool and commercial cell tests, i.e. corners were rounded and moderate-to-severe erosion of grains from the surfaces thereof occurred.

By modifying the phase ratio $TiB_2$:Al of Body A, the properties may be tailored to more desired values. The ratio modification can be attained by adjusting the proportions to the $TiH_2$ and $AlB_2$ reactants or by adjusting the hot pressing pressure and/or temperature to higher or lower levels that respectively cause more of less liquid aluminum phase to be squeezed out of a body during hot pressing. The latter effect is especially applicable to reaction hot pressed bodies according to the molar formula:

$$3TiH_2 + AlB_2 + 0.33AlB_{12} \longrightarrow 3TiB_2 + 1.33Al + 3H_2$$

(reactants)          (product phases)    (gas)

where the pressure can range between 4000-6000 psi (about 281-422 $kg/cm^2$). In either case, as the phase ratio $TiB_2$:Al increases, there will likely be an increase in property values such as density, modulus of rupture, Young's Modulus, hardness and electrical resistivity (because aluminum is more electrically conductive than $TiB_2$).

Bodies C and D

Two reaction hot pressed bodies were prepared according to the molar formula:

$$Ti + AlB_2 \rightarrow TiB_2 + Al$$

from a reactant mixture of 49.7 wt. % Ti powder and 50.3 wt. % $AlB_2$ powder. Their other process parameters and properties are set forth in Table 2.

TABLE 2

|  | Body C | Body D |
|---|---|---|
| Ti powder mps, $\mu$m | 4.9 | 41 |
| $AlB_2$ powder mps, $\mu$m | 10.5 | 10.5 |
| Hot pressing - |  |  |
| Temperature, °C. | 1100 | 1150 |
| Pressure, psi | 4000 | 3000 |
| ($kg/cm^2$) | 281 | 211 |
| Time @ Temp., hours | 1 | 0.5 |
| $TiB_2$ phase grain size, $\mu$m | 0.5-2 | 3-11 |
|  | (1.25 mean) | (7 mean) |
| Density, g/cc | 3.60 | 3.15 |
| Open porosity, % | 0.2 | 2.0 |
| Young's Modulus @ 20° C., psi × $10^6$ | 33.4 | 31.2 |
| ($tons/cm^2$ × $10^3$) | 2.35 | 2.19 |
| Maximum temperature without beam bend deformation under 440 psi (30.9 $kg/cm^2$) load in argon, °C. (*two separate tests) | *700 *950 | 600 |
| Cathode Pool Test | Very very slight edge erosion | Severe grain erosion |

The powder particle size and $TiB_2$ phase grain size data of Bodies C and D illustrate an observed trend in many reaction sintered cermet bodies of this invention, viz. the particle size of the powder containing the metal element which forms the nonoxide ceramic phase generally governs, in a direct proportional manner, the grain size of the nonoxide ceramic phase.

The data of Bodies C and D regarding $TiB_2$ phase grain size and Cathode Cell Tests results also show the need for the reaction sintered cermet to have a mean grain size of the nonoxide ceramic phase being not greater than 6 $\mu$m to provide good erosion resistance to cathodic molten aluminum.

Body E

A cermet example of the invention employing an intermetallic compound reactant was made according to the following molar formula:

$$TiAl + 2B \rightarrow TiB_2 + Al$$

Thus, Body E was prepared from a reactant mixture consisting of 77.3 wt. % TiAl powder of 33 $\mu$m mps and 22.7 wt. % boron powder of 94 $\mu$m mps. After mixing like Body A and hot pressing at the maximum temperature of 1450° C. and pressure of 6000 psi (421.8 $kg/cm^2$) for 1 hour, the reaction sintered body had: phases of $TiB_2$ (M) and Al(m), estimated $TiB_2$ grain size less than 2 $\mu$m, 13.7 wt. % Al, 53.7 wt. % Ti, a density of 3.95 g/cc, 0% open porosity, Young's Modulus of 54.96 × $10^6$ psi (3.864 × $10^3$ $tons/cm^2$), electrical resistivity at 20° C. of 17.0 $\mu\Omega$-cm and Rockwell A hardness of 86.5.

Body F

As an example of employing a diluent in a reactant mixture of this invention and of bonding preformed phase material together by a reactant mixture of this invention, Body F was formed in accordance with the following molar formula:

$$TiB_2 + TiH_2 + AlB_2 \longrightarrow 2TiB_2 + Al + H_2$$

(reactants)          (product phases)    (gas)

The reactant mixture consisted of 41.3 wt. % $TiB_2$ powder of 3.2 $\mu$m mps, 29.7 wt. % $TiH_2$ powder of 28 $\mu$m mps and 29.0 wt. % $AlB_2$ powder of 9.2 $\mu$m mps. Mixing was done in the same manner as for Body B, except that 4 wt. % Carbowax binder was added. The binder was burned out of the reaction mixture at 350° C. for 2 hours in air. Hot pressing was performed in the same manner as for the previous bodies, but at a maximum reaction sintering temperature of 1500° C. and at 5000 psi (351.5 $kg/cm^2$) for 2 hours. The resulting phases were $TiB_2$ (M), Al(m) and $Ti_2B_5$(T). The grain size of the boride phases was less than 10 $\mu$m. Density was 3.93 g/cc. Open porosity was 2.4%. The body was extremely tough and had a modulus of rupture at 20° C. of 43,300 psi (30.4 $tons/cm^2$). Electrical resistivities were 22.4 $\mu\Omega$-cm at 25° C. and 120.2 $\mu\Omega$-cm at 1000° C. Samples of Body F tested in the cathode pool test and hanging cathode test showed no dimensional change and no corrosion.

Body G

Other boride-metal reaction sintered cermets can be formed by appropriate choice of reactants. For example, Body G was formed according to the molar formula:

$$ZrH_2 + AlB_2 \longrightarrow ZrB_2 + Al + H_2$$

(reactants)          (product phases)    (gas)

The reactant mixture consisted of 34.3 wt. % $AlB_2$ of 18.5 $\mu$m mps and 65.7 wt. % $ZrH_2$ of 1-3 $\mu$m mps. Mixing was done the same as for Body B. Similar reaction hot pressing was performed at 1200° C. and 5000 psi (351.5 $kg/cm^2$) for 2 hours. The resulting phases were: $ZrB_2$(M), Al(m) and unknown phase (T). The grain size of the boride phase was less than 5 $\mu$m. Density was 2.62 g/cc. Open porosity was 35.7%. Impurities were: 2.0 wt. % $O_2$, 0.14 wt. % C and 0.14 wt. % $N_2$.

Young's Modulus was $8.6 \times 10^6$ psi (605 tons/cm$^2$). Shear Modulus was $3.8 \times 10^6$ psi (267 tons/cm$^2$). Poisson's ratio was 0.158. Electrical resistivity at 20° C. was 30.2 μΩ-cm. A sample of Body G tested in the cathode pool test showed no significant dimensional changes, although slight erosion of grains occurred at some corners of the sample, presumably due to the unusually high porosity of this particular body.

Body H

Illustrative of cermet composite bodies of the invention made with other metal phase is Body H formed according to the following molar formula:

NiB + 3TiH$_2$ + 5B ⟶ 3TiB$_2$ + Ni + 3H$_2$ (reactants)  (product phases)  (gas)

The reactant mixture consisted of 25.48 wt. % NiB powder of −35 mesh, 54.76 wt. % TiH$_2$ powder of 2.4 μm mps and 19.76 wt. % B of 2 μm mps. This mixture was ball milled in dry condition in the same manner as for Body A, but milling was continued for a longer time of 16 hours to reduce the NiB particle size to −325 mesh. Then the mixture was hot pressed in the previously described manner at 1250° C. and 4000 psi (281.2 kg/cm$^2$). Similar to the reaction sintered cermet bodies with aluminum metal phase, some of the nickel phase of Body H is squeezed out during hot pressing and it flows out through the small spaces between the two end plungers and the annular body comprising the conventional graphite mold assembly. However, since nickel is a heavier element than aluminum, it contributed (along with hydrogen evolution) a relatively larger weight loss (24%) from this body vis a vis the weight of its reaction mixture. X-ray analysis showed only TiB$_2$ phase presumably because the amount of nickel phase left in Body H was less than the lower quantitative detection limit of the x-ray equipment. Nevertheless, quantitative chemical analysis of Body H showed 63.5 wt. % Ti and 3.35 wt. % Ni. Body H was found to have TiB$_2$ grain size of less than 2 μm, a density of 4.53 g/cc, 0% open porosity, Young's Modulus of $71.7 \times 10^6$ psi ($5.04 \times 10^3$ tons/cm$^2$) and Rockwell A hardness of 91.5.

Bodies I-1 to I-2

Two bodies of the invention were formed by reaction sintering after the reactant mixture was first fully shaped (i.e. without hot pressing). A reactant mixture the same as for Body A was wet mixed in the same manner as in the mixing for Body E. That mixture was isostatically pressed at 50,000 psi into two green bodies and the resultant green bodies were heated at 300° C. in air to burn out the wax binder. Then those bodies were fired at 100° C./hr. in argon to the maximum reaction sintering temperature: one body at 1200° C. and the other at 1500° C. After 6 hours at those temperatures, the bodies were cooled at 100° C./hr. in argon. The resultant cermet bodies were hard but porous with the following characteristics:

| Body: | I-1 | I-2 |
|---|---|---|
| Maximum temperature: | 1200° C. | 1500° C. |
| | TiB$_2$ (M) | TiB$_2$ (M) |
| | Al (m) | Al (m) |
| | Al$_2$O$_3$ (T) | |
| TiB$_2$ phase grain size, μm | ≦2 | ≦2 |
| Density, g/cc | 1.82 | 2.05 |
| Open porosity, % | 42.3 | 37.1 |

| Body: | I-1 | I-2 |
|---|---|---|
| Oxygen impurity, wt. % | 2.3 | 2.0 |

Other reaction sintered cermet bodies (with or without hot pressing as desired) can be formed by appropriately selecting other reactant mixtures within the invention definition. The following molar formulas are illustrative of such other selections:

TiH$_2$ + Al + 2B → TiB$_2$ + Al + H$_2$

3 TiH$_2$ + AlB$_2$ + 0.3 AlB$_{12}$ → 3TiB$_2$ + 1.3 Al + 3H$_2$

NbH$_2$ + AlB$_2$ → NbB$_2$ + Al + H$_2$

Cr + AlB$_2$ → CrB$_2$ + Al

Fe$_2$B + 4 TiH$_2$ + 7B → 4TiB$_2$ + 2 Fe + 4H$_2$

FeB + Ni → NiB + Fe

Al + 2BN + 4Ti → TiB$_2$ + 2TiN + TiAl

TiN + Al → AlN + Ti

AlSi$_2$ + Ti → TiSi$_2$ + Al

TaSi$_2$ + Ti → TiSi$_2$ + Ta

CoSi$_2$ + Th → ThSi$_2$ + Co

Al$_2$S$_3$ + 3Ce → 3CeS + 2 Al

FeS + Mn → MnS + Fe 1.5 PbS$_2$ + 2Al → Al$_2$S$_2$30 1.5 Pb

ZnS + Ba → BaS + Zn

I claim:

1. A reaction sintered cermet body consisting of a fine-grained, homogeneous, intimate interdispersion of:
   (a) 40–95 mole percent of first phase or phases having a maximum grain size substantially not greater than 10 μm and being boride, nitride, silicide, sulfide or combination thereof of one or more of the elements of Groups 2a, 3a exclusive of B, 4a, 2b, 3b including lanthanide and actinide series elements, 4b, 5b, 6b, 7b and 8;
   (b) 5–60 mole percent of second phase or phases being metal, alloy, intermetallic compound or combination thereof of one or more of the elements of Groups 3a exclusive of B, 4a, 2b, 4b, 5b, 6b, 7b, iron, cobalt and nickel; and
   (c) optionally diluent selected from nonreacted portion of reactants forming the first and second phases and preformed material that is the same as the first and/or second phases;
   which body contains 0 to 4 weight percent oxygen and is prepared by the process comprising:
   (d) admixing particulate exothermic reactants of maximum particle size substantially not greater than 150 μm and being elements, compounds, intermetallic compounds, alloys or combination thereof in stoichiometric proportions to substantially form the first and second phases, and
   (e) shaping and heating the admixture to form the reaction sintered body, and heating being done in nonreactive atmosphere and at temperature at which the reaction and sintering occurs between the reactants to substantially form the first and second phases.

2. The body of claim 1 which is prepared by the shaping and heating being separate sequential steps.

3. The body of claim 1 which is prepared by the shaping and heating being substantially simultaneous steps of hot pressing.

4. The body of claim 1 wherein the mean grain size of the first phase or phases is not greater than 6 μm and the mean particle size of the reactants is less than 100 μm.

5. The body of claim 4 wherein the maximum grain size of the first phase or phases is substantially not greater than 5 μm and the maximum particle size of the reactants is substantially not greater than 44 μm.

6. The body of claim 5 wherein the maximum grain size of the first phase or phases is substantially not greater than 2 μm.

7. The body of claim 6 wherein the mean grain size of the first phase or phases is less than 1 μm.

8. The body of claim 1 having the first phase or phases being boride, nitride, silicide, sulfide or combination thereof of one or more of the elements of Groups 4b, 5b and 6b, having the second phase being Al.

9. The body of claim 8 having the first phase or phases being diboride of one or more of the elements of Group 4b.

10. The body of claim 1 having 45-95 mole percent of the first phase or phases and 5-55 mole percent of the second phase or phases.

11. The body of claim 10 which is prepared by the shaping and heating being substantially simultaneous steps of hot pressing.

12. The body of claim 11 wherein the mean grain size of the first phase or phases is not greater than 6 μm and the mean particle size of the reactants is less than 100 μm.

13. The body of claim 12 having the first phase or phases being boride, nitride, silicide, sulfide or combination thereof of one or more of the elements of Groups 4b, 5b and 6b, and having the second phase being Al.

14. The body of claim 13 wherein the maximum grain size of the first phase or phases is substantially not greater than 2 μm.

15. The body of claim 14 wherein the mean grain size of the first phase or phases is less than 1 μm.

16. The body of claim 15 having the first phase or phases being diboride of one or more of the elements of Group 4b.

17. The body of claim 16 wherein the Al at least partially separating the grains of diboride is in thin layers less than about 1000Å.

18. The body claim 17 having a first phase of $TiB_2$.

19. The method of forming the body of claim 1 comprising:
    (a) admixing the particulate reactants, and
    (b) shaping and heating the admixture to form the reaction sintered body.

* * * * *